United States Patent
Lievore

(10) Patent No.: US 11,926,301 B2
(45) Date of Patent: *Mar. 12, 2024

(54) AXLE WEIGHT SENSING DEVICE

(71) Applicant: Dexter Axle Company LLC, Elkhart, IN (US)

(72) Inventor: Samuel N. Lievore, Elkhart, IN (US)

(73) Assignee: Dexter Axle Company LLC, Elkhart, IN (US)

(*) Notice: Subject to any disclaimer, the term of this patent is extended or adjusted under 35 U.S.C. 154(b) by 114 days.

This patent is subject to a terminal disclaimer.

(21) Appl. No.: 17/448,377

(22) Filed: Sep. 22, 2021

(65) Prior Publication Data

US 2022/0017050 A1 Jan. 20, 2022

Related U.S. Application Data

(63) Continuation of application No. 16/353,341, filed on Mar. 14, 2019, now Pat. No. 11,130,479.

(51) Int. Cl.
*B60T 8/18* (2006.01)
*B60B 35/04* (2006.01)
*B60G 11/04* (2006.01)
*B60G 11/113* (2006.01)
*G01G 3/08* (2006.01)
*G01G 19/12* (2006.01)

(52) U.S. Cl.
CPC ........... *B60T 8/1837* (2013.01); *B60B 35/04* (2013.01); *B60G 11/04* (2013.01); *B60G 11/113* (2013.01); *G01G 3/08* (2013.01); *G01G 19/12* (2013.01); *B60G 2202/112* (2013.01); *B60T 2250/00* (2013.01); *B60Y 2200/147* (2013.01)

(58) Field of Classification Search
None
See application file for complete search history.

(56) References Cited

U.S. PATENT DOCUMENTS

| | | | |
|---|---|---|---|
| 2011/0042154 A1* | 2/2011 | Bartel | B60W 10/184 180/11 |
| 2012/0123646 A1* | 5/2012 | Mantini | B62D 61/12 73/488 |
| 2013/0253814 A1* | 9/2013 | Wirthlin | G01G 19/02 701/1 |
| 2014/0278041 A1* | 9/2014 | Brenninger | F16H 61/435 701/124 |

* cited by examiner

Primary Examiner — Tamara L Weber
(74) Attorney, Agent, or Firm — McGarry Bair PC

(57) ABSTRACT

A vehicle weight sensing system particularly useful for trailers. An axle tube is mounted to the vehicle or trailer through its suspension members that may be leaf springs. A mounting block is affixed to the axle tube for mounting a strain gauge. The mounting block is fixed to the axle tube between the suspension members connected to the axle tube. The mounting block has a mounting surface opposite to the mating surface and a notch extends from the mating surface toward the mounting surface. The notch terminates between the mating surface and the mounting surface. The notch separates rigidified sections of the mounting block and the rigidified sections straddle the notch. The stain gauge measures strain in the axle and thereby generates a signal proportional to the weight on the trailer. The signal can be used to properly proportion a brake system on the trailer.

16 Claims, 10 Drawing Sheets

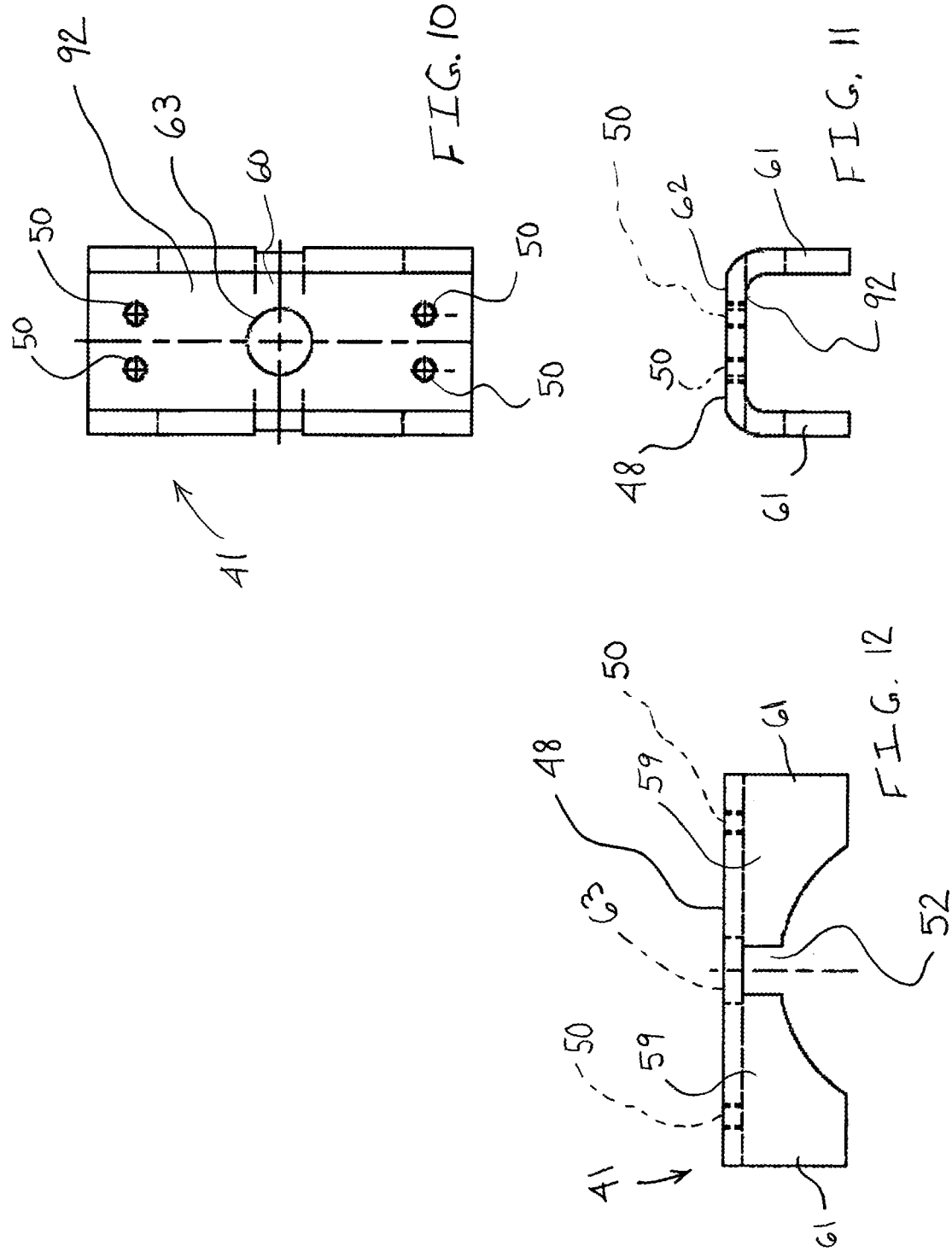

AXLE WEIGHT SENSING DEVICE

BACKGROUND OF THE INVENTION

Knowing the weight of a trailer and its payload are important for towing. In cases where the trailer to be towed includes its own brakes, knowing the weight of the trailer and its payload are important so the proper proportioning of the brakes may be set. If a user of a trailer is forced to manually set the proportioning of trailer brakes, such a task is often done by guessing or trial and error. If brakes are set that exert too much force, the trailer may exert too much braking force and jerk the vehicle through over application. Another consequence of having too much braking force may be the potential to lock the wheels of the trailer. Locking trailer wheels can result in an unstable condition that may cause jackknifing or loss of control for both the trailer and towing vehicle. Further, setting trailer brakes properly for one loading condition will not be the correct setting for another loading condition. It is certainly possible that a user of the trailer may properly set the trailer for an unloaded condition, then forget to set the trailer brakes for a loaded condition. If this occurs, the brakes on the towing vehicle may be overworked because the trailer brakes are contributing too little. It is also possible that a user of the trailer will forget to reset brakes that were properly set for a loaded trailer and proceed with over proportioned brakes on an empty trailer. If this occurs, wheel lock up may be the result. Current systems often require significant user intervention in properly setting the proportion on the trailer brakes to the extent it is nearly impossible to maximize braking performance under all loading conditions. As such, there is a need for a system that provides certainty that trailer brakes are properly proportioned based on its loading without user intervention.

SUMMARY OF THE INVENTION

A vehicle weight sensing system having an axle with an axle tube. The axle tube has a first mounting portion and a second mounting portion that is spaced from the first mounting portion along the axle tube. A first suspension member is connected to the first mounting portion and the vehicle, and a second suspension member is connected to the second mounting portion and the vehicle. A mounting block is affixed to the axle tube. The mounting block has a mating surface that is for being affixed to the axle tube in a complementary manner. The mounting block is fixed to the axle tube between the first and second mounting portions. The mounting block has a mounting surface opposite to the mating surface and a notch extends from the mating surface toward the mounting surface. The notch terminates between the mating surface and the mounting surface. The notch separates rigidified sections of the mounting block and the rigidified sections straddle the notch.

A strain gauge assembly has a body including raised pads near opposite ends of the body. A thinned section is located between the raised pads. The thinned section of the body includes a strain gauge affixed thereto. The strain gauge assembly is mounted to the mounting block so that the raised pads are affixed to separate rigidified sections of the mounting block and the thinned section is spaced from the mounting surface of the mounting block.

A further aspect of the invention may use the strain gauge to produce a signal that is used by the braking system to proportion the gain of the brakes in response to the weight of the vehicle. This is especially useful when the vehicle is a trailer.

BRIEF DESCRIPTION OF THE DRAWINGS

FIG. 10 is a top view of a mounting block removed from the axle tube so that the bridge can be seen;

FIG. 11 is a perspective view of the mounting block shown in FIG. 10 removed from the axle tube so that the legs can be seen;

FIG. 12 is a side view of the mounting block, shown in FIGS. 10 and 11 removed from the axle tube so that the notch can be seen.

DETAILED DESCRIPTION OF INVENTION

Figure 1:
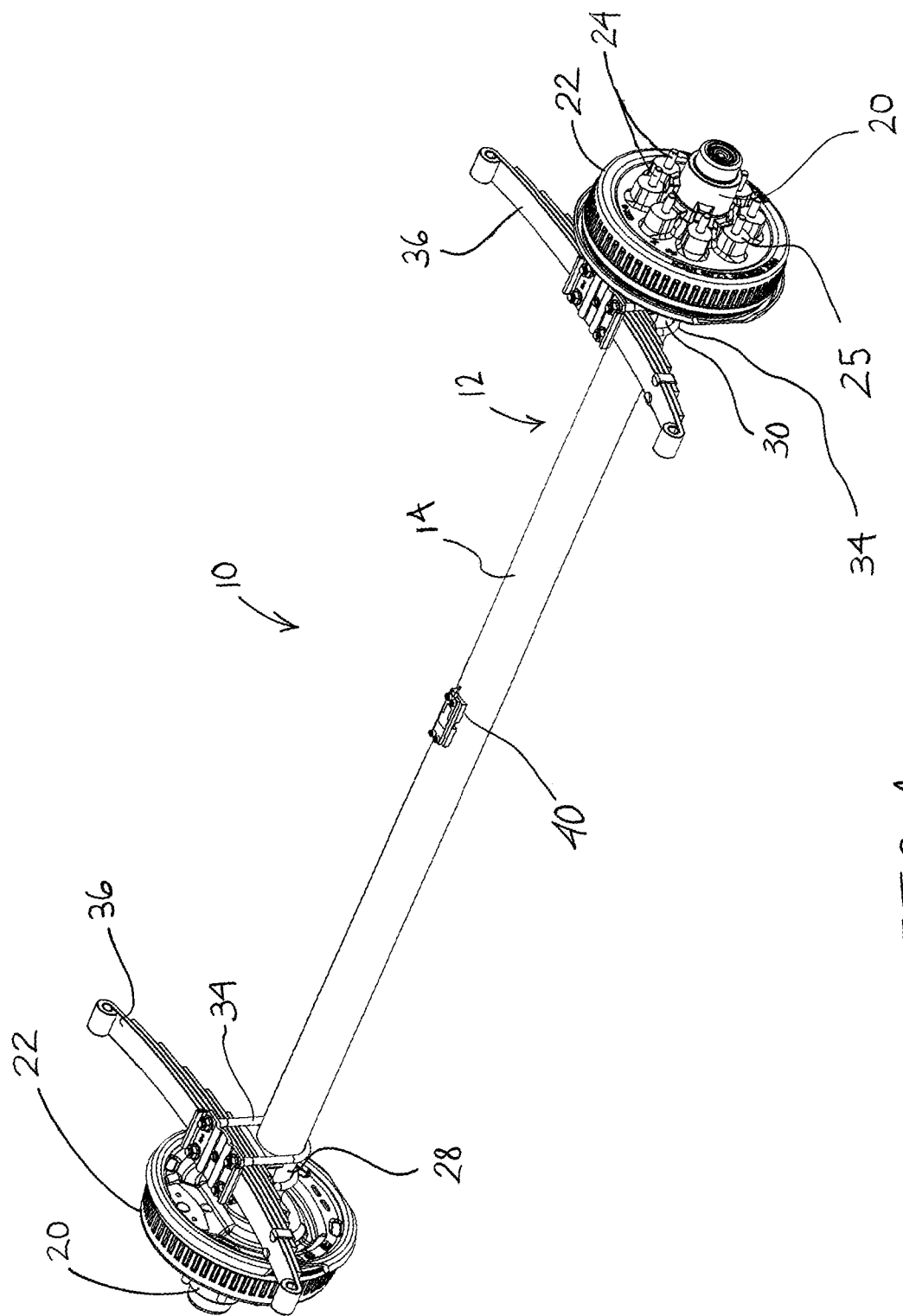
FIG. 1 is a perspective view of an axle system used on a vehicle that is connected to the vehicle using leaf springs and the vehicle is not shown for clarity.
Figure 2:
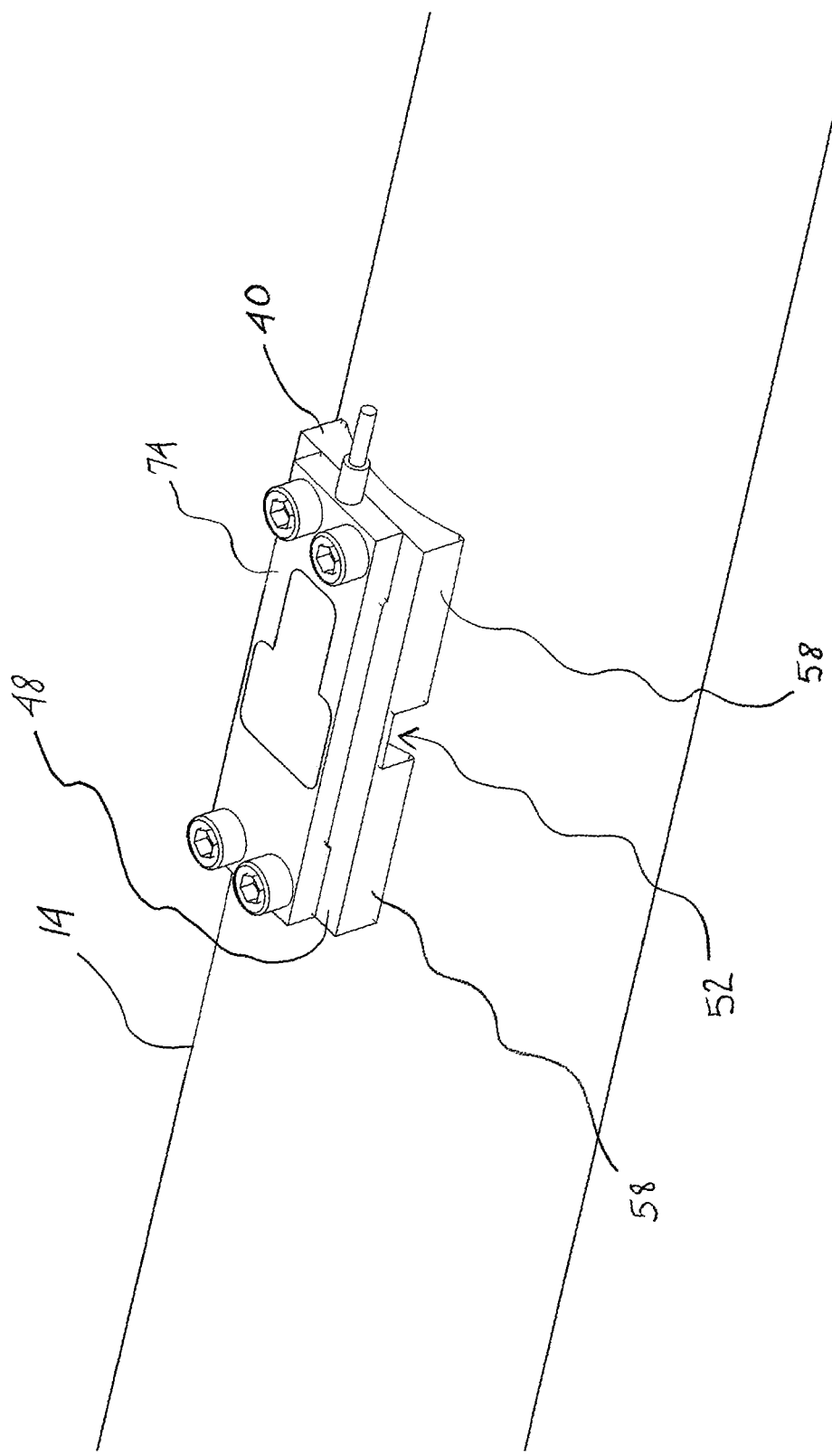
FIG. 2 is a magnified view of the axle shown in FIG. 1 showing how a strain gauge is attached to a mounting block on the axle.
Figure 3:
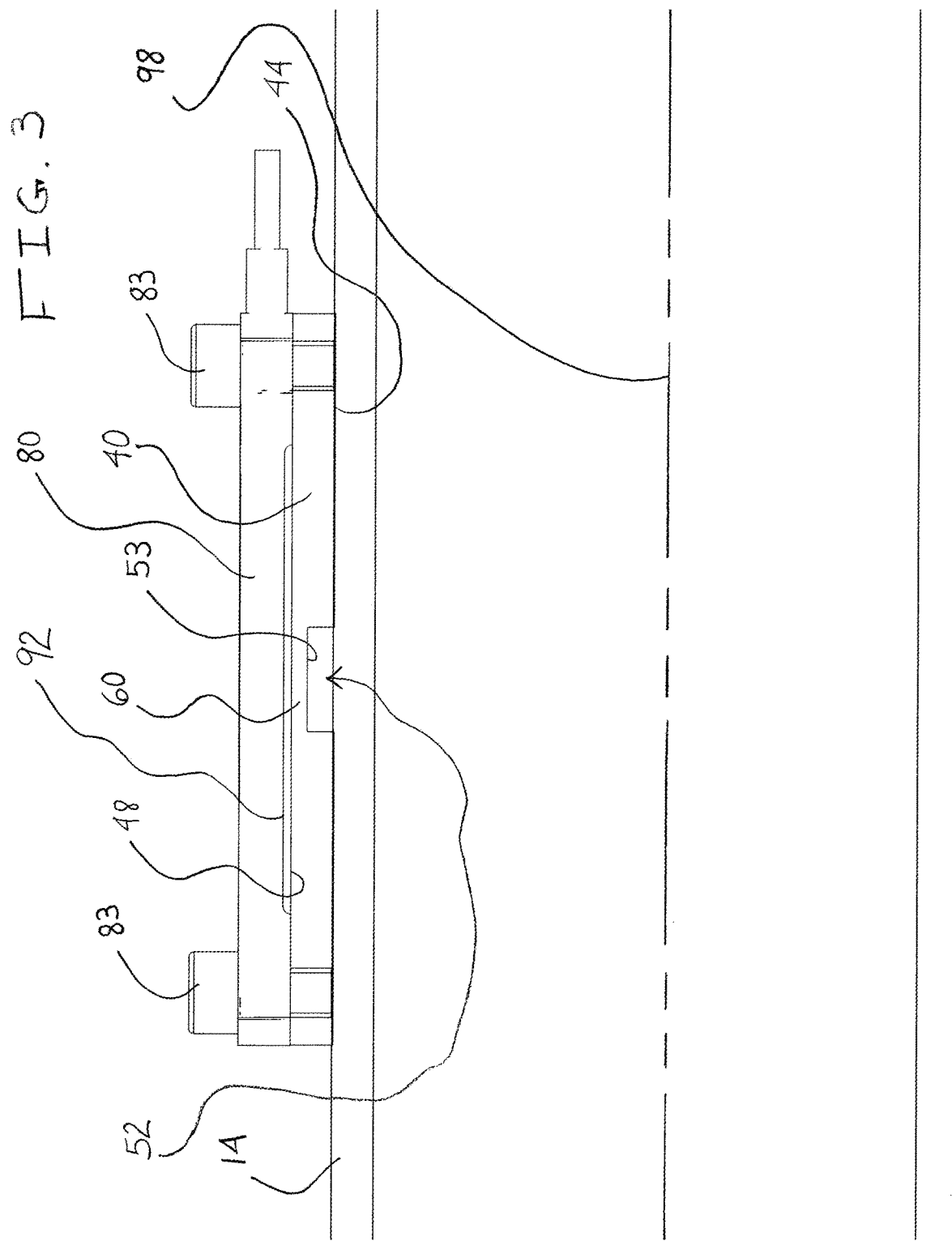
FIG. 3 is a sectional view of the axle shown in FIGS. 1 and 2 through the center of the axle tube and mounting block on the axle.

FIG. 1 shows a perspective view of a vehicle weight sensing system 10. The system 10 has an axle 12 having an axle tube 14. In the present system 10, the axle tube 14 is round. The axle tube 14 is hollow as shown in FIG. 3. Opposite ends of the axle 12 have spindles 20. The spindles 20 include a brake drum 22 and have studs 24 that extend from the drum 22 for mounting wheels that are not shown in FIG. 1. The studs 24 extend from a wheel mounting surface 25 on the drum 22 and the wheels are clamped onto the wheel mounting surface 25 once lug nuts are tightened onto the studs 24. Along the axle tube 14 there are mounting portions 28, 30. The first mounting portion 28, is on the left-hand side of FIG. 1 and the second mounting portion 30 is near the right-hand side of FIG. 1. The mounting portions 28, 30 are inward of the ends of the axle tube 14 and inward of the spindles 20. Each mounting portion 28, 30 is adapted for receiving a U-bolt 34 for holding a corresponding leaf spring 36 to the mounting portion 28, 30 of the axle tube 14.

Figure 4:
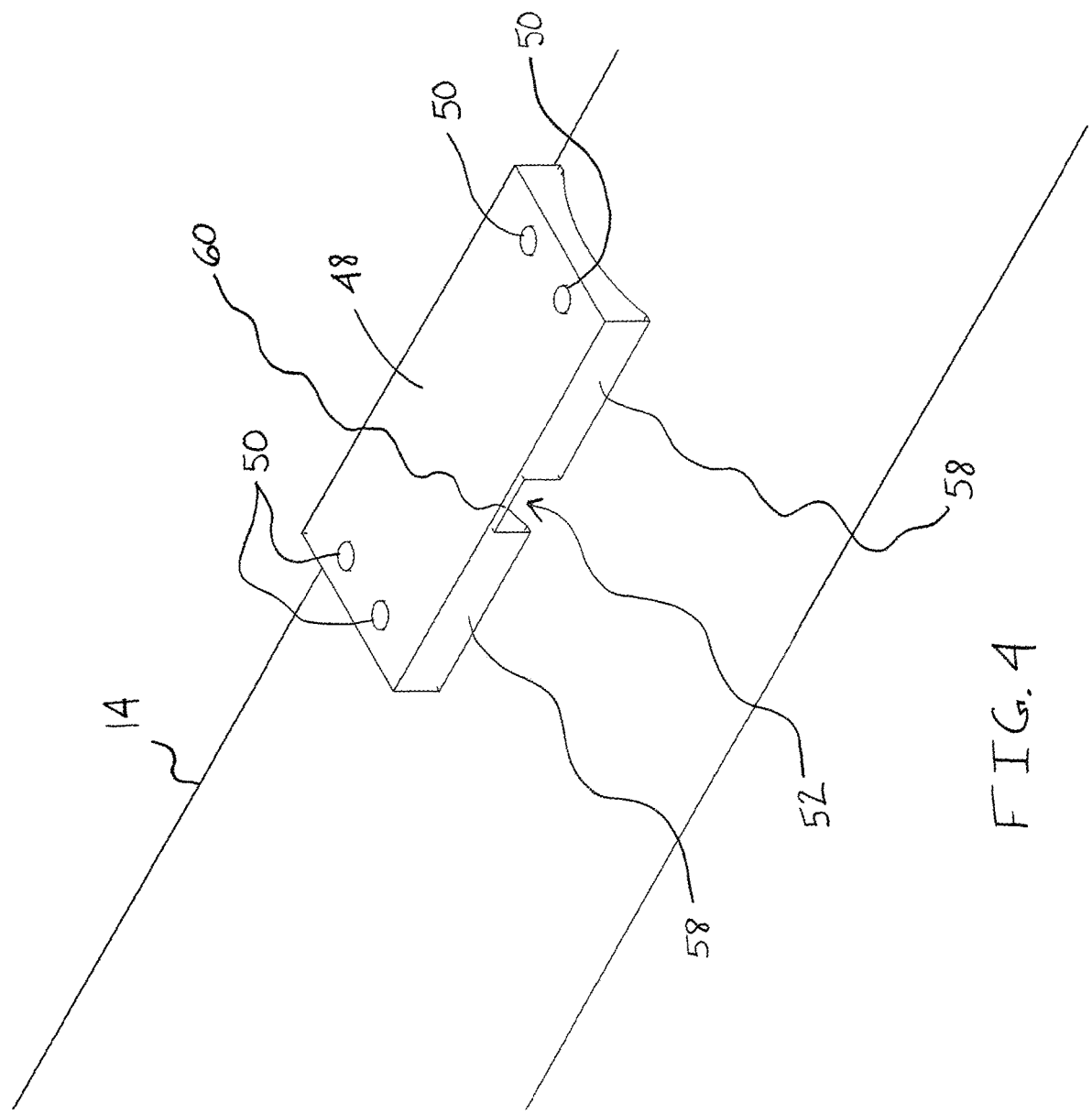
FIG. 4 is a perspective view of the axle shown in FIGS. 1-3 with the strain gauge assembly removed from the mounting block.
Figure 5:
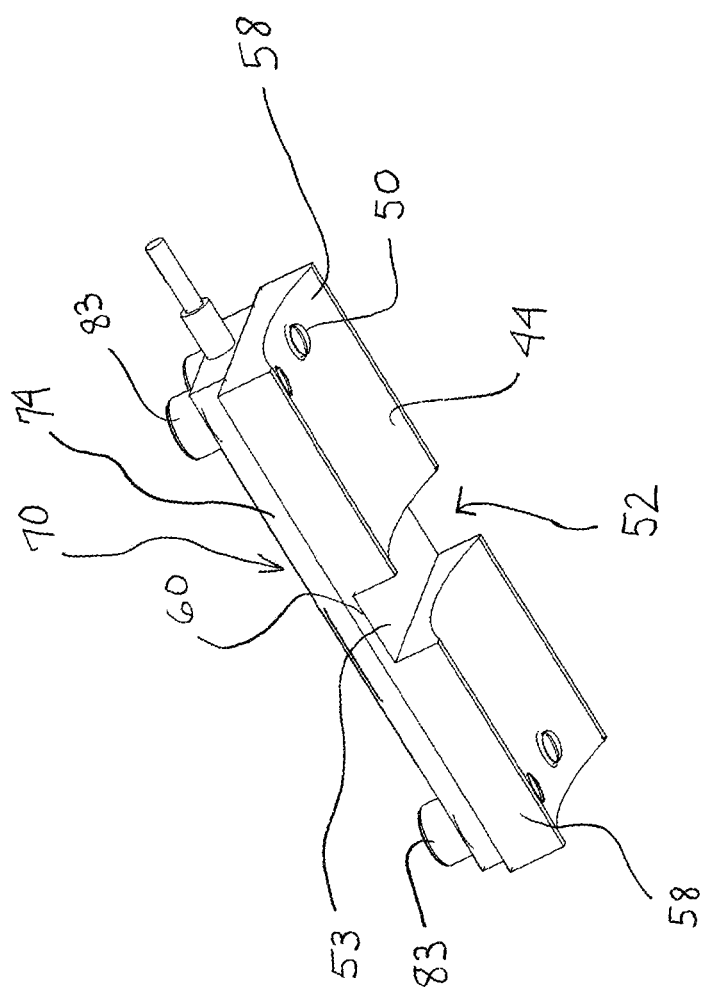
FIG. 5 is a perspective view of the mounting block shown in the previous FIGS. removed from the axle tube so that the mating surface can be seen.
Figure 6:
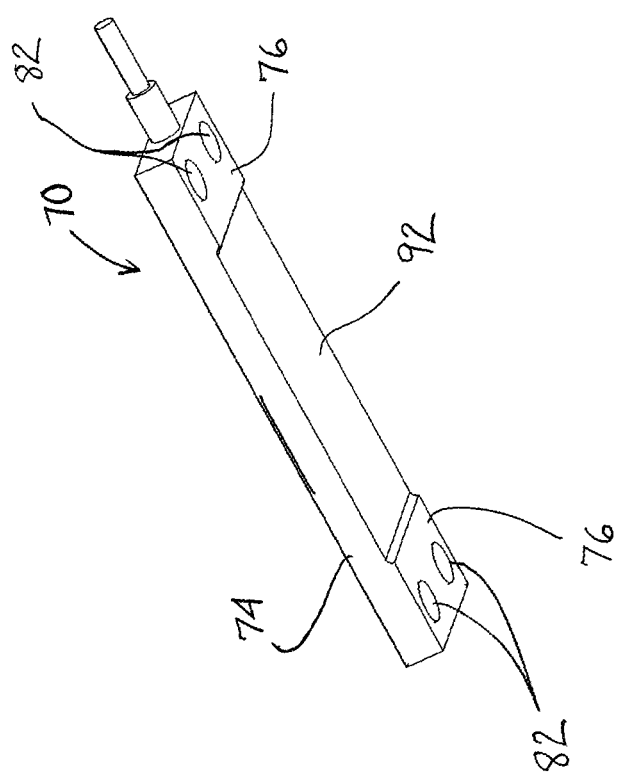
FIG. 6 is a perspective view of the strain gauge assembly that is shown in FIGS. 1-3.
Figure 7:
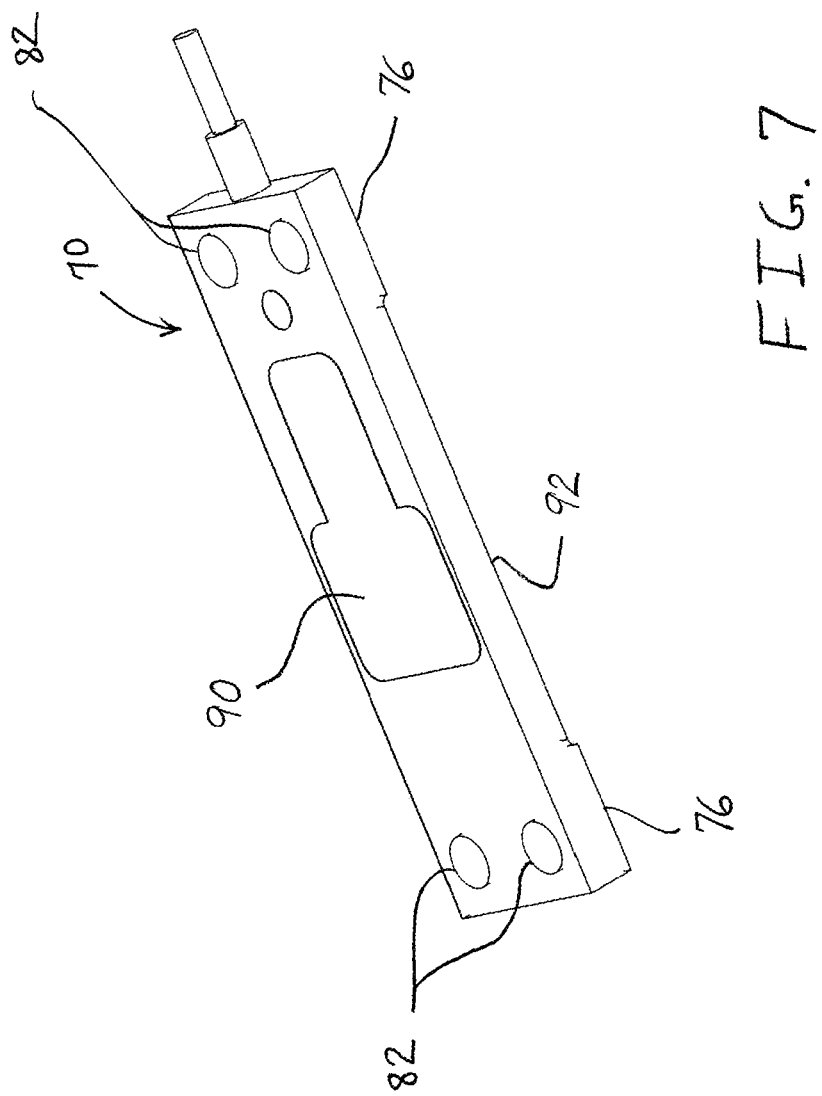
FIG. 7 is a perspective view of the strain gauge assembly shown in FIG. 6 showing the top side and the strain gauge mounted to the body of the strain gauge assembly.

The leaf springs 36 are mounted to a vehicle which is not shown, but may be a trailer. As such, the weight of the trailer, which is well suited as a vehicle for the system of the present invention, is supported on the leaf springs 36. The axle tube 14 has a mounting block 40 that is affixed to the middle of the axle tube 14 along its length. The mounting block 40 has a mating surface 44 that directly contacts the axle tube 14 in a complementary fashion. In the case of the present invention, the mating surface 44 is concave because the axle tube 14 is round. It is contemplated a mounting block different than the mounting block 40 shown in FIG. 4 may be used for axle tubes having different cross sections. In the case of a rectangular axle tube, the mating surface 44 would be flat to be complementary with such a rectangular axle tube. The mating surface 44 is permanently affixed to the axle tube 14 and is typically welded to the axle tube 14. The mounting block 40 has a mounting surface 48 that is opposite the mating surface 44. The mounting surface 48 is a flat planar surface that includes four tapped holes 50. A notch 52 extends from the mating surface 44 toward the mounting surface 48. The notch 52 stops at surface 53 that is between the mating surface 44 and the mounting surface 48. The notch 52 separates two rigidified sections 58 of the mounting block 40. The rigidified sections 58 are solid sections from the mounting surface 48 to the mating surface 44 and therefore, resist bending or elongation along the length of the rigidified sections 58. The rigidified sections 58 extend from the notch 52 to ends of the mounting block 40. The notch 52 forms a bridge 60 that joins the rigidified sections 58 that straddle the notch 52. The mounting surface 48 is offset from the axle tube 14. It is contemplated that the rigidified sections 58 may be rigidified by other means than making them solid sections and such structures as ribs, bosses, or honeycomb areas may be used to stiffen the rigidified sections 58 to be more rigid than the bridge 60. Another contemplated mounting block 41 is shown in FIGS. 10-12. The mounting block 41 has legs 61 that form rigidified sections 59 that straddle notch 52. A bridge 62 over the notch 52 includes a hole 63 that localizes strain in the bridge 62 to the areas adjacent to the hole 63.

The mounting surface 48 of the mounting block 40 accepts a strain gauge assembly 70. The strain gauge assembly 70 has a metal body 74 that has raised pads 76 on an underside of the strain gauge assembly 70. The body 74 has a thinned section 80 that is located between the raised pads. Holes 82 are located near corners of the body 74 and receive screws 83 that clamp the body 74 to the mounting surface 48 of the mounting block 40. A strain gauge 90 is mounted to an upper side of the body 74 and the strain gauge 90 is located opposite to the raised surface 92 that is located between the raised pads 76. When the strain gauge assembly 70 is mounted to the mounting block as shown in FIG. 3, the raised surface 92 is spaced from the mounting surface 48 of the mounting block. The screws 83 clamp the body 74 of the strain gauge assembly 70 across different rigidified sections 58 of the mounting block 40.

The mounting block 40 keeps strain induced by axle loading largely constrained to a plane parallel to the mounting surface 48. The mounting block 40 also locates the strain gauge 90 away from the neutral axis 98 of the axle tube 14. The loading of the axle tube 14 configuration as shown in FIG. 1, puts compressive stresses above the neutral axis 98 of the axle tube 14. The compressive stresses are translated into strain that is more easily measured at greater distances from the neutral axis 98. The mounting block 40 locates the strain gauge assembly 70 away from the neutral axis 98 to a greater extent than if the strain gauge 90 were applied directly to the axle tube 14 and predictably locates the strain though the use of a notch 52 located between the rigidified sections 58. The mounting configuration of the strain gauge assembly 70 ensure strain can be measured by the strain gauge 90 along the thinned section 80. In certain configurations, it is contemplated that the strain gauge 90 can be mounted directly to the axle tube 14 and in such a case it is preferable to have the strain gauge mounted as far as possible from the neutral axis 98. According to the loading as shown in FIG. 1, that greatest distance from the neutral axis 98 corresponds to locations on the top of the axle tube 14 (at the present location of the mounting block 40) or on the bottom of the axle tube 14.

The strain gauge 90 produces a signal in response to the strain. The signal from the strain gauge 90 indicates strain in proportion to weight placed upon the trailer, or other suitable vehicle, to which the axle 12 is connected. The weight is borne through the leaf springs 36 and imparts downward forces upon the axle tube 14 through the mounting portions 28, 30, thereby causing strain proportional to the weight the vehicle bears. Thus, the signal from the strain gauge 90 may be used to approximate vehicle weight. It is contemplated that using a second axle 12 may be suitable for some trailers and this would include another strain gauge 90 mounted as described.

Figure 8:
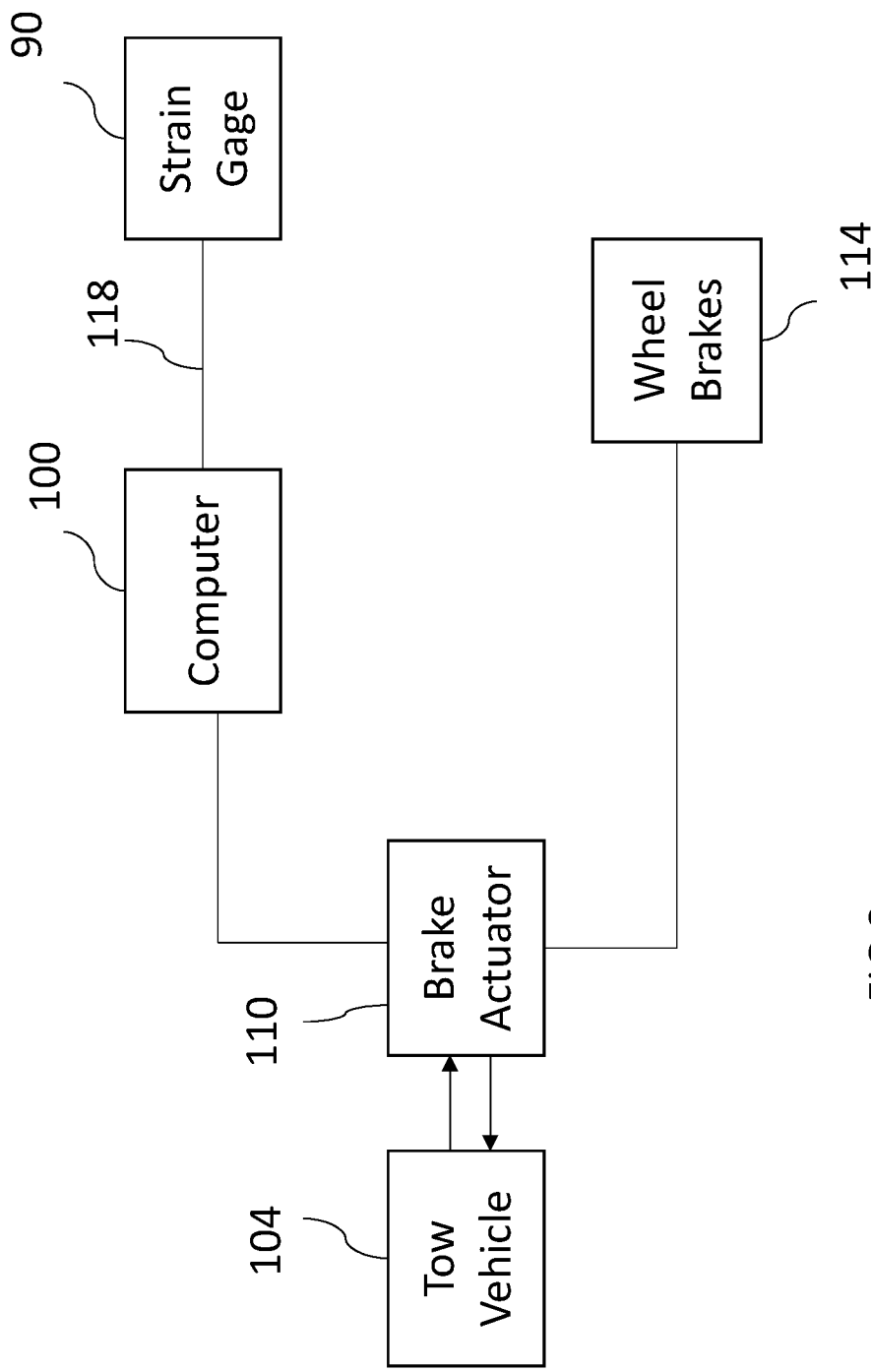
FIG. 8 is a block diagram explaining how the strain gauge is used to proportion trailer brakes when the vehicle containing the present invention is a trailer and hydraulic brakes are used.
Figure 9:
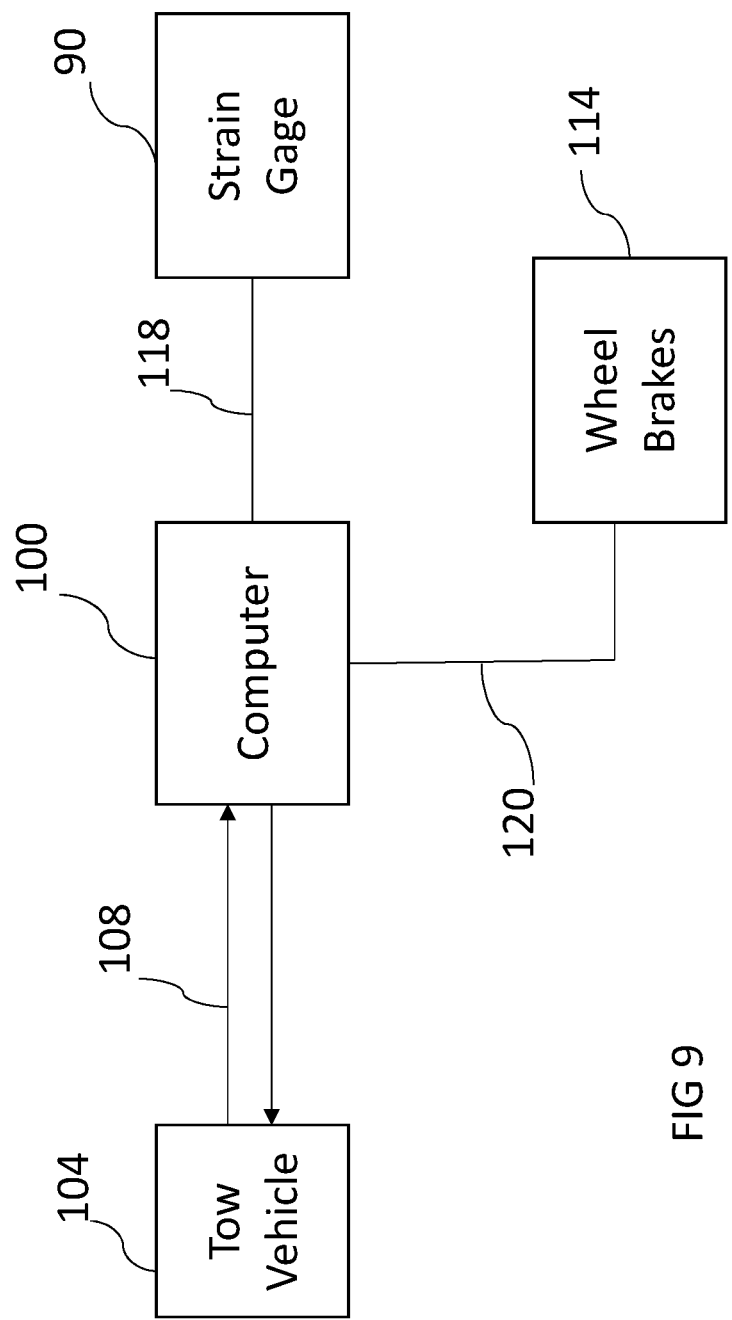
FIG. 9 is a block diagram explaining how the strain gauge is used to proportion trailer brakes when the vehicle containing the present invention is a trailer and electric brakes are used.

The signal from the strain gauge 90, or multiple strain gauges 90 if multiple axles 12 are used, may be passed through a device such as a computer 100 that can be used to determine the gain of the trailer brakes. The brakes may be electrical or hydraulic brakes that are actuated in response to the towing vehicle slowing the trailer. FIG. 8 shows the situation where hydraulic brakes are used on the trailer. During acceleration or deceleration, the tow vehicle 104 exerts a force 108 on the hitch which is passed onto a brake actuator 110. The actuator 110 applies appropriate pressure to the wheel brakes 114 in proportion to the force 108. The pressure the actuator 110 delivers may be changed by the computer 100 based on the signal 118 from the strain gauge 90, which then changes the force from the wheel brakes 114. FIG. 9 shows the use of electric trailer brakes. In this case, the tow vehicle 104 exerts a force 108 that is sent to a computer 100. The computer 100 may then send an electrical voltage 120 directly to the wheel brakes 114 based on the stain signal 118 from the strain gauge 90. The computer 100 can determine the weight based on the strain signal 118 and dynamically determine the appropriate gain on the trailer brakes based on the instantaneous weight of the trailer. As such, braking performance is continuously optimized.

What is claimed is:

1. A system for controlling a braking force applied to a trailer, said system comprising:
   said trailer having trailer brakes located on an axle, said axle having a hollow axle tube supporting said trailer and connected thereto through mounting portions, said trailer towable by a vehicle having a controller with a proportional braking signal, said proportional braking signal moveable between a signal representing no braking force from said vehicle and a signal representing full braking force from said vehicle;
   a unitary mounting block with a mounting surface affixed on top of said axle tube between said mounting portions, said unitary mounting block having a notch facing said axle tube and interrupting said mounting surface and said notch located opposite a continuous mating surface, said continuous mating surface facing away from said axle tube;
   a strain gauge assembly affixed to said continuous mating surface of said unitary mounting block and straddling said notch;
   a computer in electrical communication with said proportional braking signal from said vehicle and a weight signal from said strain gauge assembly, said computer having a gain determined by said weight signal from said strain gauge assembly, said computer configured to:
receive said proportional braking signal;
calculate a weight of said trailer with said weight signal when said trailer is unloaded;
establish said gain with said unloaded weight and control said trailer brakes with said gain when said vehicle provides said proportional braking signal; and
increase said gain when said weight signal indicates said weight of said trailer has increased; and
control said trailer brakes with said increased gain when said vehicle provides said proportional brake signal.

2. The system of claim 1, wherein said trailer brakes are electrically actuated.

3. The system of claim 1, further comprising a hydraulic actuator in fluid communication with said trailer brakes and in electrical communication with said computer, said trailer brakes are hydraulically actuated.

4. The system of claim 1, wherein said notch interrupts said mounting surface and separates rigidified sections of said unitary mounting block.

5. The system of claim 4, wherein said strain gauge assembly has a body including raised pads near opposite ends of said body and a thinned section between said raised pads, said thinned section of said body including a strain gauge affixed thereto, said strain gauge assembly mounted to said unitary mounting block so that said raised pads are affixed to separate said rigidified sections of said unitary mounting block and said thinned section is spaced from said mounting surface of said unitary mounting block.

6. A device for controlling a braking force applied to a trailer, said device comprising:
said trailer towable by a vehicle and said vehicle having a controller having a proportional braking signal, said proportional braking signal moveable between a signal representing no braking force from said vehicle and a signal representing full braking force from said vehicle;
trailer brakes located on said trailer;
an axle having a hollow axle tube supporting said trailer and connected thereto through mounting portions,
a unitary mounting block affixed on top of said axle tube between said mounting portions, said unitary mounting block having a notch facing said axle tube and located opposite a continuous mating surface;
a strain gauge assembly affixed to said continuous mating surface of said unitary mounting block, said strain gauge assembly straddling said notch;
a computer in electrical communication with said proportional braking signal from said vehicle and a weight signal from said strain gauge assembly, said computer having a gain defined by a proportion of said proportional braking signal from said vehicle applied to said trailer brakes, said computer configured to:
receive said proportional braking signal from said vehicle;
calculate a weight of said trailer with said weight signal when said trailer is unloaded;
establish said gain with said unloaded weight and control said trailer brakes with said gain when said vehicle provides said proportional braking signal; and
increase said gain when weight signal indicates said weight of said trailer has increased and control said trailer brakes with said increased gain when said vehicle provides said proportional braking signal.

7. The device of claim 6, wherein said trailer brakes are electrically actuated.

8. The device of claim 6, further comprising a hydraulic actuator in fluid communication with said trailer brakes and in said electrical communication with said computer, said trailer brakes are hydraulically actuated.

9. The device of claim 6, wherein said notch separates rigidified sections of said unitary mounting block.

10. The device of claim 9, wherein said strain gauge assembly has a body including raised pads near opposite ends of said body and a thinned section between said raised pads, said thinned section of said body including a strain gauge affixed thereto, said strain gauge assembly mounted to said unitary mounting block so that said raised pads are affixed to separate said rigidified sections of said unitary mounting block and said thinned section is spaced from said mounting surface of said unitary mounting block.

11. A device for controlling a braking force applied to a trailer, said device comprising:
said trailer towable by a vehicle and said vehicle having a controller having a proportional braking signal, said proportional braking signal moveable between a signal representing no braking force from said vehicle and a signal representing full braking force from said vehicle;
trailer brakes located on said trailer;
an axle having a hollow axle tube supporting said trailer and connected thereto through mounting portions,
a unitary mounting block affixed to said axle tube between said mounting portions and spaced from a neutral axis of said axle tube, said unitary mounting block having a notch facing said axle tube and located opposite a continuous mating surface;
a strain gauge assembly affixed to said continuous mating surface of said unitary mounting block, said strain gauge assembly straddling said notch;
a computer in electrical communication with said proportional braking signal from said vehicle and a weight signal from said strain gauge assembly, said computer having a gain defined by a proportion of said proportional braking signal from said vehicle applied to said trailer brakes, said computer configured to:
receive said proportional braking signal from said vehicle;
calculate a weight of said trailer with said weight signal when said trailer is unloaded;
establish said gain with said unloaded weight and control said trailer brakes with said gain when said vehicle provides said proportional braking signal; and
increase said gain when weight signal indicates said weight of said trailer has increased and control said trailer brakes with said increased gain when said vehicle provides said proportional braking signal.

12. The device of claim 11, wherein said unitary mounting block is affixed to a top of said axle.

13. The device of claim 11, wherein suspension members are connected to said trailer and said mounting portions of axle tube.

14. The device of claim 13, wherein said suspension members are leaf springs.

15. The device of claim 11, wherein said trailer brakes are electrically actuated.

16. The device of claim 11, further comprising a hydraulic actuator in fluid communication with said trailer brakes and in electrical communication with said computer, said trailer brakes are hydraulically actuated.

\* \* \* \* \*